June 19, 1934.  J. L. BARR  1,963,879
PARKING APPARATUS
Original Filed Sept. 18, 1929  3 Sheets-Sheet 1
FIG.1.
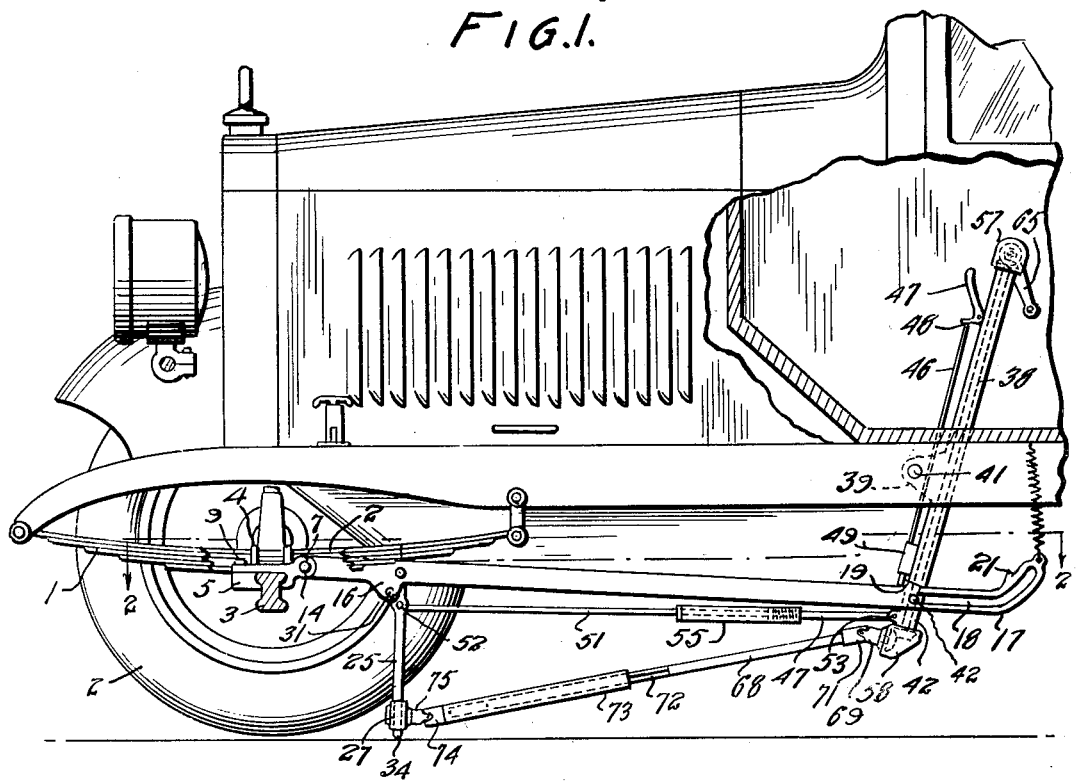
FIG.2.  FIG.9.
FIG.10.
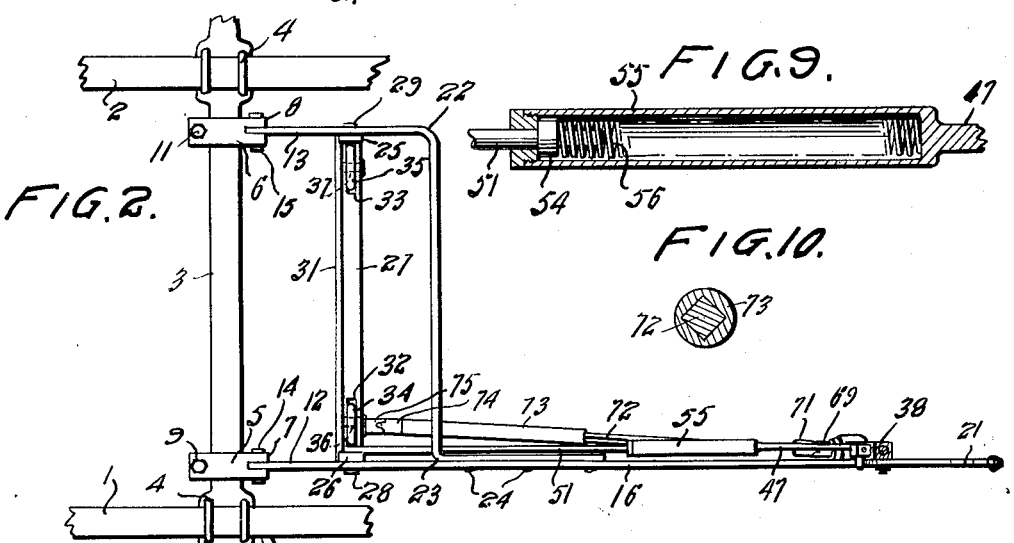
Inventor
JOHN L. BARR
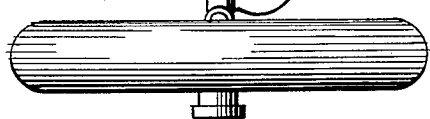
Attorneys June 19, 1934.  J. L. BARR  1,963,879
PARKING APPARATUS
Original Filed Sept. 18, 1929  3 Sheets-Sheet 2
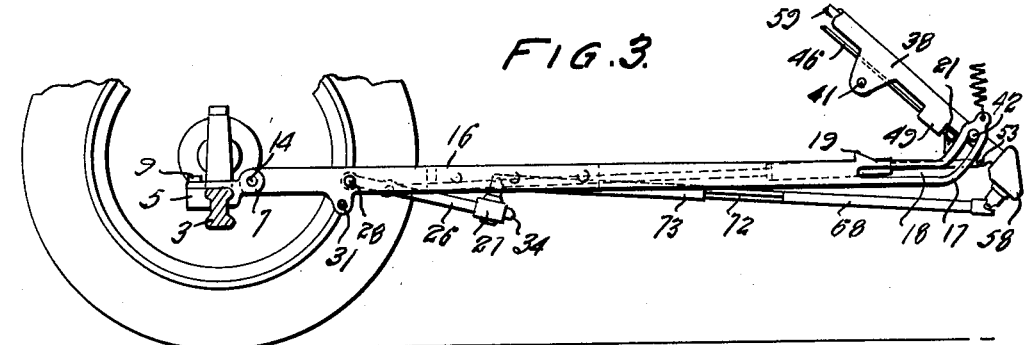
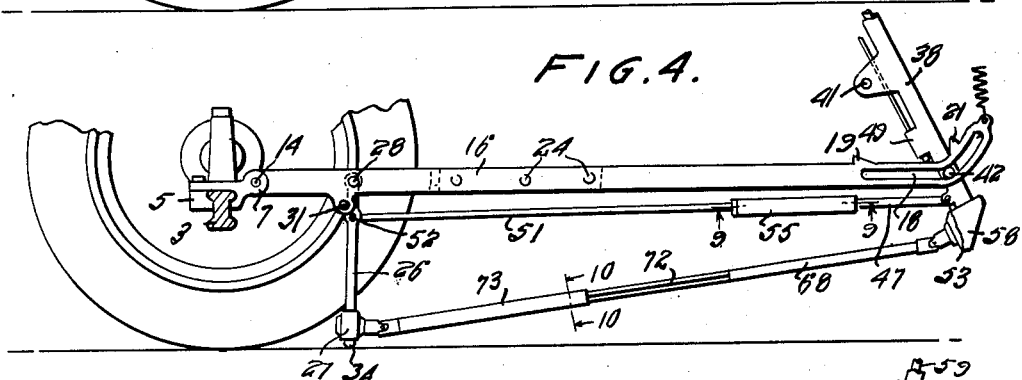
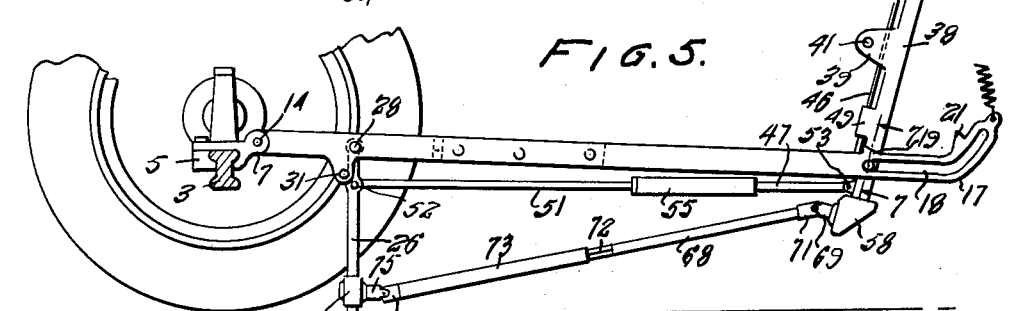
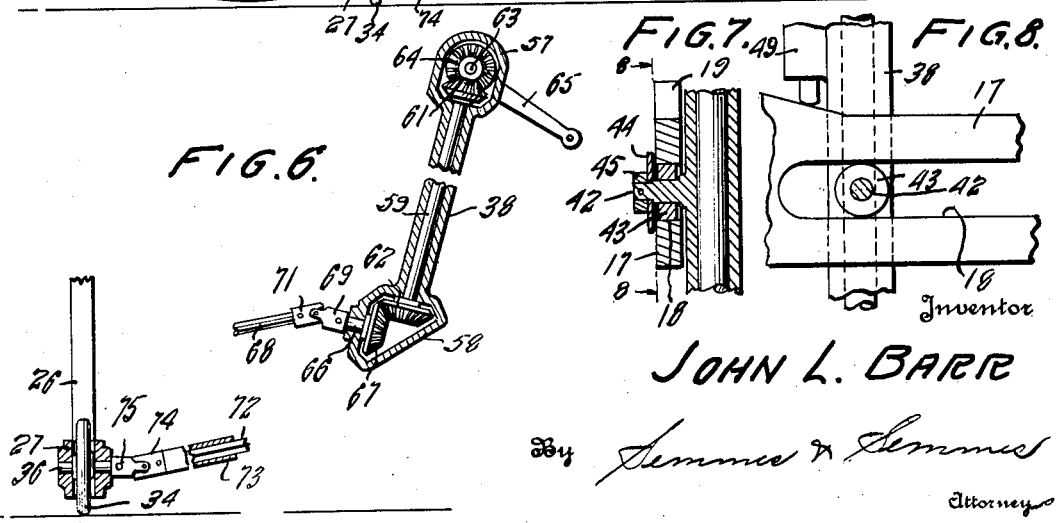
Inventor
JOHN L. BARR
Attorneys June 19, 1934.   J. L. BARR   1,963,879
PARKING APPARATUS
Original Filed Sept. 18, 1929   3 Sheets-Sheet 3
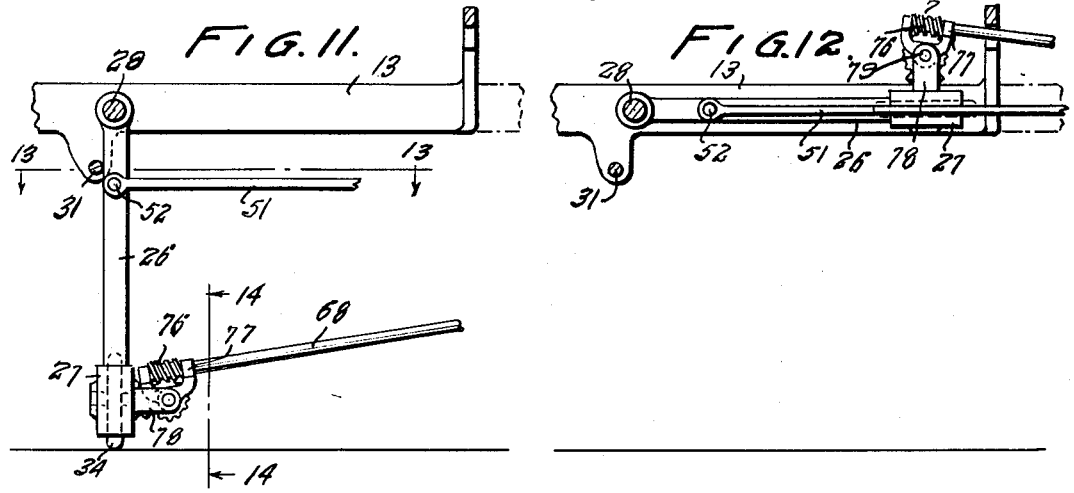
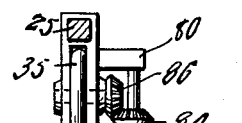
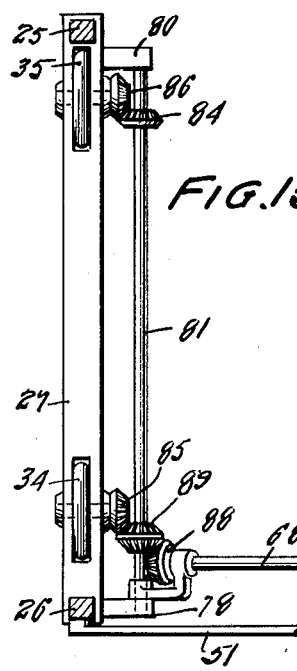
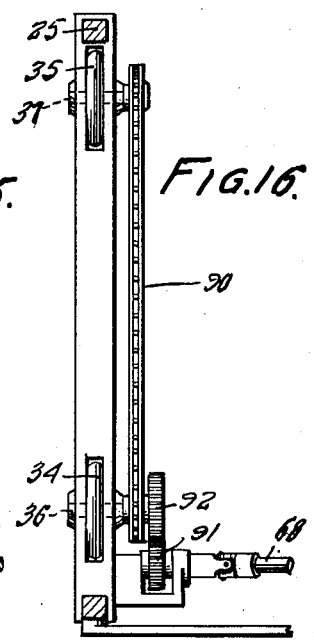
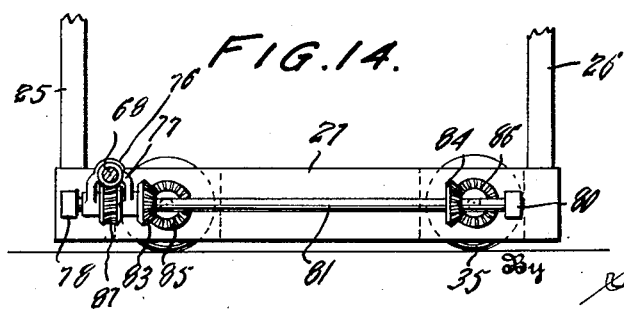
Inventor
JOHN L. BARR Patented June 19, 1934

1,963,879

UNITED STATES PATENT OFFICE 1,963,879

PARKING APPARATUS

John Lester Barr, Chevy Chase, Md.

Application September 18, 1929, Serial No. 393,490
Renewed February 9, 1934

6 Claims. (Cl. 180—1)

This invention relates in general to lifting devices and more particularly has reference to a manually operated apparatus for moving an end of a vehicle sideward to facilitate parking.

I have previously filed certain applications which are copending, namely, Serial No. 350,685, Vehicle lifting device, Serial No. 357,254, Movable vehicle lifting device, and Serial No. 363,172, Device for driving a vehicle sideward, of which the present application is a continuation in part, directed to elevating an end of a vehicle by movement thereof. In these same applications, I also in some instances made provision for moving the elevated end of a vehicle sideward either by manual or mechanical operation.

I have, as previously stated, provided for elevating an end of a vehicle to allow free turning of the steering wheels by reason of the weight of the vehicle on the same being relieved. Movement of the vehicle, however, has been necessary to effect the elevation of the steering wheels.

It will be manifest that under certain conditions in maneuvering in a confined space of the character of a parking area between vehicles, longitudinal movement of a vehicle may be impossible. Also that the driving of a vehicle on a support such as I have shown in my copending applications may present some difficulty to inexperienced operators.

Besides these foregoing objections to my prior devices, the mechanical operation of the rollers on a support to drive the vehicle sideward has necessitated certain modifications in the engine and body assembly of the vehicle, and has likewise presented some difficulty for efficient operation by inexperienced operators.

An object of this invention is to provide an apparatus for elevating one end of the vehicle while the same is stationarily positioned.

Another object of this invention is to provide an apparatus for elevating one end of the vehicle while stationary which may be operated from a driver's compartment.

Still another object of this invention is to provide an apparatus for elevating one end of a stationary vehicle from a driver's compartment, with provision for moving the elevated end of the vehicle sideward on a support.

A further object of this invention is to provide an apparatus for elevating the front wheels of a vehicle while stationary from the driver's compartment, and of manually moving the elevated end sideward through a mechanism associated with the same control.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification,

Figure 1 is a side elevational view of the front end of a conventional vehicle having the apparatus for elevating the front wheels of the same and driving the elevated end of the vehicle sideward installed thereon.

Figure 2 is a top view taken on line 2—2 of Figure 1 looking in the direction of the arrows.

Figure 3 is a side elevational view of the apparatus showing the support in inoperative position.

Figure 4 is a side elevational view showing the positioning of the support preparatory to elevating the front wheels.

Figure 5 is a side elevational view of the apparatus showing the same in operative position.

Figure 6 is a sectional view of the control lever.

Figure 7 is a sectional view taken on line 7—7 of Figure 5 looking in the direction of the arrows.

Figure 8 is a side elevational fragmentary view of the cooperating lever.

Figure 9 is a sectional view taken on line 9—9 of Figure 4.

Figure 10 is a sectional view of the roller operating arm taken on line 10—10 of Figure 4.

Figure 11 is a side elevational view showing another form of roller driving mechanism in operative position.

Figure 12 is a side elevational view showing the same driving mechanism in inoperative position.

Figure 13 is a top view taken on line 13—13 of Figure 11.

Figure 14 is a back view taken on line 4—4 of Figure 11.

Figure 15 is a top view of another form of driving mechanism.

Figure 16 is a top view of still another form of driving mechanism.

Referring more particularly by numerals to the drawings in which the same and similar elements are designated by like symbols of reference throughout, and more especially to Figures 1 and 2 there is shown the front end of a conventional motor vehicle having the frame mounted on leaf springs 1 and 2 supported on a front axle 3 and affixed thereto by brackets 4. The axle 3 shown in Figure 1 is I-shaped or formed in any other suitable manner for receiving clamps 5 and 6. The clamps 5 and 6 are formed with split eyes 7 and 8 at one end and secured by bolts 9 and 11 at the other end. It will be manifest that the clamps 5 and 6 may be of any suitable type and secured to the axle in any desired manner, to effect a firm connection.

A plurality of levers 12 and 13 provided with apertures at the ends are adapted to be fitted in the split eyes 8 and 9 and fixed for rotation therein by pins 14 and 15. The lever 12 as shown in Figure 1 consists of an extended arm having integral amount of projection 16 adjacent the front end thereof, and the opposite end curved upward as at 17 and formed with a slot 18. The arm is provided in addition with integrally formed catch projections 19 and 21 on the rear end, adjacent the beginning and termination of the slot 18, respectively.

The lever 13 is bent as at 22 and oppositely bent as at 23, the end being fixed to the lever 12 by rivets 24 or any other suitable means. It will thus be appreciated that by operating the lever 12, the lever 13 will be concomitantly moved.

A support such as is shown in Figures 11 and 14 consisting of a plurality of vertical arms 25 and 26 fixed in a cross-member 27 is mounted on the levers 12 and 13 and fixed for rotation thereon by pins 28 and 29. Movement of the support forward past the center is prevented by a cross-bar 31 fixed in the projection 16 formed on the levers. The bottom of the support is formed with slots 32 and 33 and rollers 34 and 35 mounted therein on axles 36 and 37.

The support is adapted to be downwardly positioned against the cross-bar 31 by operation of the lever 12. The lever 12 may be constructed to allow for automatic lengthening thereof to prevent strain upon it in the event of there being a tendency for such strain to be exerted by reason of the movement of the springs of the car due to an unevenness of the road bed when the lever 12 is raised in an inoperative position and the whole mechanism is at rest. This could be accomplished by constructing the lever 12 in two parts allowing one part to telescope through the other.

Movement of the arm 12 is effected by a control lever 38, having an integral projection 39 formed on one side, pivoted to the frame by a pin 41. A pin 42 carrying a roller 43 is seated in the face of the lever near the bottom. The roller 43 is adapted to engage in the slot 18 formed in the arm 12 and is held therein by a washer 44 and nut 45 on the pin 42 as shown in Figure 7.

It will be apparent that by movement of the lever 38, the arm 12 may be lowered or raised by engagement of the roller 43 in the curved slot 18.

A rod 46 connected at one end to a spring handle 47 pivoted on the side of the lever 38 by a pin 48, is slidably mounted adjacent the side of the lever through an integral guide member 49 formed on the side of the lever near the bottom. The bottom end of the rod 46 is adapted to engage the catch projections 19 and 21 formed on the arm 12, so as to maintain the latter member either in raised or lowered position as shown in Figure 8.

The support which is operated by movement of the arm 12 is lowered and raised by a rod 51 pivoted to one leg 26 at the top on a pin 52 and pivoted at the other end to a projection 53 formed on the side of the lever 38 at the bottom.

The rod 51 is broken as shown in Figure 9 and provided with a collar 54 adjacent one end. The other open end of the rod 51 is formed as a cylinder 55 adapted to be engaged by the collar 54. A helical spring 56 is interposed between the collar 54 and the end of the cylinder. It will thus be seen that the lengthening and shortening of the rod 51 is compensated for against spring pressure.

In this manner, through movement of the lever 38, the support may be lowered by the rod 51, and the end of the vehicle elevated by the arm 12.

The lever 38 as is better shown in Figure 6 is hollow and is provided at each end with integrally formed gear boxes 57 and 58. A shaft 59 having bevel gears 61 and 62 operating in the boxes 57 and 58, respectively, fixed on each end, is enclosed in the hollow lever 38.

The gear box 57 is provided with an aperture having a shaft 63 carrying a bevel gear 64, operating therein. The bevel gear 64 is operated by a crank 65 fixed to the outer end of the shaft 63 and is adapted to rotate the shaft 59 by engagement with the bevel gear 61.

The gear box 58 is provided with an aperture having a shaft 66 carrying a bevel gear 67 operating therein.

The bevel gear 67 is adapted to rotate a rod 68 connected to the outer end of the shaft 66 by universal joint members 69 and 71 by engagement with the bevel gear 62. The rod 68 is square in cross-section adjacent the other end as at 72 and is adapted to slidably engage in a receiving member 73. The member 73 is connected by universal joint members 74 and 75 to the shaft 36 carrying the roller 34 in the base portion 27 of the support. Thus by rotating the crank 65, the roller 34 may be actuated to move the elevated end of a vehicle sideward in either direction according to the direction in which the crank is rotated.

The operation of this invention will be readily understood with reference to Figures 3, 4 and 5. In Figure 3 the support is shown in the inoperative raised position with the lever 38 moved forward. With backward movement of the lever 38, as shown in Figure 4, the support is lowered to the surface upon which the vehicle is resting, against the cross-bar 31 by movement of the rod 51. With the support thus lowered the end of the vehicle may be elevated by further backward movement of the lever 38 lowering the lever arm 12, and raising the end of the vehicle on the support.

When the end of the vehicle is elevated on the support, the same may be moved sideward in either direction by manipulation of the crank 65 on the lever 38 operating the roller 34 on the support as previously described.

In Figures 11 through 16 are shown various modified forms of driving the rollers on the support. For example, in Figures 11 through 14 the rod 68 is shown with a worm gear 76 mounted on the end, together with a guide 77 pivoted to a projection 78 on the base portion of the support by a pin 79. The base portion is provided with a corresponding projection 80 at the other end, and the ends of a shaft 81 journaled therein. A plurality of bevel gears 83 and 84 are keyed on the shaft adapted to engage corresponding bevel gears 85 and 86 keyed on the other ends of the shafts 36 and 37 carrying the rollers 34 and 35 in the base portion of the support. In addition a gear 87 is keyed on the shaft between the guide 77, adapted to be engaged by the worm gear 76.

In this manner by rotation of the rod 68 through the crank 65, both of the rollers may be positively driven. Similarly in Figure 15 a bevel gear 88 is shown keyed on the end of the rod 68 adapted to engage a double face bevel gear 89 keyed on the shaft 81. Also in Figure 16 the rollers 34 and 35 are shown connected by a chain 90 operating on gears fixed on the shafts 36 and 37, the same being driven by gears 91 and 92 operating on the rod 68 and the shaft 36, respectively.

There is accomplished by this invention an apparatus for elevating one end of a vehicle while the same is in a stationary position and of moving the elevated end of the vehicle sideward in either direction, which may be operated from the driver's compartment by a single control.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A parking apparatus for a stationary vehicle, comprising a lever for pivoting on the axle of a vehicle, a support extending across the longitudinal axis of the vehicle carried on the lever behind the axle, and an arm for operating the lever to lower the support and elevate the axle thereon.

2. A parking apparatus for a stationary vehicle, comprising a lever for pivoting on the axle of a vehicle, a support pivoted on the lever behind the axle, a rod connected to an arm for operating the lever, adapted to lower the support with movement of the arm to elevate the axle thereon through operation of the lever.

3. A parking apparatus for a stationary vehicle, comprising a lever for pivoting on the axle of a vehicle, a support carrying rollers pivoted on the lever behind the axle, an arm for lowering the support through a connecting rod, and elevating the axle on the support by operation of the lever, and means to rotate the rollers to move the end of the vehicle sidewise.

4. A parking device for a stationary vehicle, comprising a lever for pivoting on the axle of a vehicle, a support carrying rollers pivoted on the lever behind the axle, an arm for lowering the support through a connecting rod, and elevating the axle on the support by operation of the lever, and a crank on the arm for operating a shaft and a gear arrangement connected between the arm and the rollers to move the end of the vehicle sidewise.

5. A parking device for a stationary vehicle, comprising a lever for pivoting on the axle of a vehicle, a support carrying rollers pivoted on the lever behind the axle, said lever having a projection to prevent the support from extending beyond a vertical position when lowered, an arm for lowering the support through a connecting rod and elevating the axle on the support by operation of the lever, and a crank on the arm for operating a shaft and a gear arrangement connected between the arm and the rollers to move the end of the vehicle sidewise.

6. A parking device for a stationary vehicle, comprising a lever for pivoting on the axle of a vehicle, a support carrying rollers pivoted on the lever behind the axle, said lever having a projection to prevent the support from extending beyond a vertical position when lowered, an arm for lowering the support through a connecting rod and elevating the axle on the support by operation of the lever, said rod being provided with a cylinder to compensate for the spring pressure, a crank on the arm for operating a shaft and a gear arrangement connected between the arm and the rollers to move the end of the vehicle sidewise.

JOHN LESTER BARR.